United States Patent Office 2,949,389
Patented Aug. 16, 1960

2,949,389

PRODUCTION OF LEVULOSE

Justin J. Murtaugh and John J. Mahieu, Newaygo, Mich., assignors to Dawe's Laboratories, Inc., Chicago, Ill., a corporation of Illinois No Drawing. Filed Mar. 17, 1958, Ser. No. 721,649

11 Claims. (Cl. 127—36)

This invention relates to the production of levulose (also known as fructose) and it relates more particularly to the recovery of levulose by crystallization from compositions in which it is contained in solution.

The concepts of this invention have application to systems in which levulose is present in a dissolved state and wherein inhibitors are present to prevent maximum recovery of levulose by crystallization.

In the copending application of Holsing and Holstein, Ser. No. 326,586, filed December 17, 1952, now Patent No. 2,844,540, description is made of the process wherein levulose has been identified in a fermentation broth resulting from the action of the mold *Aspergillus niger* on the substrate containing invert sugar (hydrolyzed sucrose), which constitutes a mixture of equal parts glucose and levulose. The mold functions to oxidize the glucose portion of the invert sugar to gluconic acid, leaving the levulose portion essentially intact. The gluconic acid is neutralized upon formation with caustic soda or with calcium carbonate for conversion to a salt such as sodium gluconate or calcium gluconate which can be separated by fractionation or preferential crystallization procedures.

For the recovery of the levulose from a system of the type described, attempts have been made to achieve separation by crystallization from a concentrated solution, but it has been found that only a fraction of the levulose present is capable of being crystallized from the solution. It was found that the rate of crystallization of the levulose from the concentrated filtrate was considerably slower than expected and that the recovery was incomplete. After a first or second crystallization, no further crystals of levulose could be separated from the syrup even though it was known that a considerable amount of levulose was still present in the composition. It was found further that the syrup resisted further crystallization of the levulose notwithstanding the fact that analysis clearly indicated that at least one-third of the levulose originally present in the fermentation broth remained in the syrup. It is widely known that the presence of small quantities of foreign substances will inhibit the crystallization of sugars such as levulose. Since, in our work, de-ionized syrups presented this crystallization difficulty whereby it could not be blamed on the presence of ionic materials, it was believed that one or more organic impurities in the syrup might be responsible, at least in part, for the poor and slow recovery of the levulose by crystallization. Attempts have been made to separate and identify the impurities but, to the present, such attempts have met with failure.

It is an object of this invention to produce and to provide a method for producing levulose which crystallizes from solutions in which it is contained and it is a related object to provide a method which permits substantially complete and rapid recovery of levulose by crystallization from systems which have heretofore resisted such crystallization in comparable amounts.

In other words, it is an object of this invention to provide a method which tends to inactivate or otherwise nullify the effects of compounds present in the system which operate to inhibit the crystallization of levulose and it is a related object to provide a process which permits the recovery of maximum amounts of levulose by fractional crystallization; which makes the levulose crystals available in a form which permits easy and complete separation; which provides a relatively pure levulose which is free of contaminating materials, and which can be employed without the necessity of removal of materials originally present to inhibit the crystallization of the levulose.

It has been found that the yield of crystals of levulose from a syrup resulting from the action of mold on a substrate containing invert sugar can be greatly increased by treatment of the syrup by a combination of steps which includes a first acidification step followed by a digestion step prior to the step of fractional crystallization. The yield is not only greater but the recovery of the levulose in a lesser number of crystallizations is much more complete. The same concepts are applicable to other solutions in which inhibitors might be present to prevent or minimize maximum crystallization of the levulose for recovery.

As the acidifying substance, use can be made of the common mineral acids as represented by hydrochloric acid, sulfuric acid, nitric acid, phosphoric acid and the like, or some of the stronger organic acids as represented by oxalic acid, citric acid, and the like. The acid should be incorporated into the composition in an amount sufficient, upon subsequent heating, to adjust the specific optical rotation of the composition to a numerically greater negative value or in an amount sufficient to increase the capacity of the solution to reduce alkaline copper reagents. The foregoing are the results observed in the characteristics of the composition when the solution or syrup is in condition, upon addition of the acidic material and subsequent digesting, to release a greater quantity of contained levulose by crystallization. The foregoing conditions and limitations can be taken as the minimum point for the addition of the acidic medium, as distinguished from a maximum.

When measured from the standpoint of pH, addition of acidic medium in amounts to adjust the pH of the syrup or solution to a level below pH 4.0 appears to give the desired results. It is preferred to add the acids in an amount to adjust the pH to between 1 and 2. Prior to the time of treatment, the syrup or levulose solution embodying the crystallization inhibiting constituents may be diluted to a solids content of about 5–50 percent by weight of the solution and preferably to a concentration of about 20 percent plus or minus 5 percent. When desirable, such dilution can be made with water. It will be understood that such dilution is not essential to the practice of this invention since its primary purpose is to enhance the handling and processing of the material.

Without the step referred to as the digesting step, after acid addition, little if any benefit is derived from the acidification of the syrup or levulose solution. The digesting step can be achieved by allowing the mixture to stand for a while after acidification at or about room temperature but the digesting step can be accelerated by heating the mixture to an elevated temperature thereby to process the solution in a considerably shorter period of time. At a temperature within the range of 40–80° C., a period of about 5–60 minutes is sufficient. Longer times obviously can be employed at these elevated temperatures but without too much additional benefit. Temperatures in excess of 80° C. should not be employed because levulose is somewhat susceptible to destruction at such higher temperatures. It is preferred to maintain the composition at a temperature within the range of 60–70° C. for the purpose of carrying out the digesting step.

The characteristics of the reactions have not been determined and it is not certain that they can be determined unless the factor or factors inhibiting the crystallization of the levulose can be isolated or identified. As previously pointed out, it has been observed that the acid treatment and digesting leads to certain measurable changes in the solution as represented by the optical rotation which is increased in its numerical negative value or by the greater capacity of the solution to reduce alkaline copper reagent. Thus we find it desirable to conduct the acid treatment until the optical rotation becomes numerically more negative or until a greater copper reducing capacity is obtained in the solution.

The observed increase in negative rotation can perhaps be explained on the basis of hydrolysis of a levulose anhydride or levulose polymer of slight or no optical activity thereby to free a levulose which is strongly levorotatory ($[\alpha]_D^{20°} = -92°$). The observed increase in copper reducing capacity can perhaps be explained on the basis of hydrolysis of a non-reducing or slightly reducing levulose anhydride or polymer to free levulose, which is more strongly reducing.

It has been established further that glucose and glucose-containing compounds such as sucrose, are absent from the non-crystallizing levulose syrup or solution. This has been indicated by the consistent negative response which has been secured by the glucose oxidase test applied to the levulose molasses or solution, both before and after treatment in accordance with the concepts of this invention.

While we have not been able to identify the substance in the solution which inhibits crystallization of levulose, it has been established that solutions containing such inhibitors, when treated in accordance with the practice of this invention, release crystallizable levulose in amount considerably greater than is capable of being recovered from an equivalent system without such treatment. This can be demonstrated by the following examples of the practice of this invention wherein use is made of a mother liquor resulting from the growth of *Aspergillus niger* in a nutrient medium containing sucrose and from which the gluconic acid and its salts have been eliminated, and from which the levulose capable of being crystallized from the syrup has also been removed, as outlined in the earlier portion of this specification. Thus the mother liquor represents a molasses or syrup containing levulose which resists crystallization.

Example 1

Two liters of mother liquor containing approximately 20 percent levulose, 75 percent methanol and 5 percent water was concentrated under vacuum. One liter of water was added when the solution volume was reduced to approximately 500 ml. and concentration was thereafter continued. The addition of water in equivalent amounts with continued concentration was repeated two more times. After the second one-liter portion of water was added, the solution was concentrated to a thick syrup containing 85 percent solids and having a specific gravity of 1.44.

The concentrate was divided into two 150-gram portions. The first portion was mixed with an equal volume of dry methanol and then it was seeded with crystals of pure levulose. The mixture was subjected to slow agitation in a sealed container at 20° C. with the intent of achieving further crystallization of the levulose from the solution. After four days, no levulose crystallization was observed. This indicated the presence of a substance in the syrup which inhibited crystallization.

The second portion of syrup was diluted with approximately three volumes of distilled water to provide a solution containing about 21 percent solids. The polarimetric reading (optical rotation) at this point in a 100 mm. tube was −22° at 20° C. One ml. of concentrated hydrochloric acid was introduced and the polarimetric reading was still found to be −22° at 20° C. The mixture was heated in a water bath for 30 minutes at 70° C. and then cooled to 20° C. At this point, the polarimetric reading was found to have numerically increased to −26.7° at 20° C.

The resulting mixture which had been acidified and digested was neutralized with 2 N sodium hydroxide to a pH of 6.0 and then concentrated to a specific gravity of 1.44. It was mixed with an equal volume of dry methanol and seeded with crystals of pure levulose and set aside with slow agitation for crystallization at 20° C. After 24 hours, levulose was found to crystallize in relatively large amounts out of the solution. The levulose was separated from the mixture by filtration and washed with dry methanol and then dried in a vacuum oven at about 30° C. The weight of the recovered levulose was 76.0 grams, corresponding to 59.7 percent of the total solids present in the concentrated syrup. An analysis of the dried product showed it to be relatively pure levulose having a specific rotation of −92° at 20° C. and the reducing equivalent by the copper reduction method also corresponded to that of pure levulose. The mother liquor and wash liquor were combined, diluted with distilled water and subjected to vacuum concentration until free of methanol. The resulting aqueous solution was tested for glucose by the glucose oxidase method and found to be free thereof.

Example 2

A mother liquor from a levulose crystallization was concentrated to a syrup containing about 85 percent solids (specific gravity 1.44). 76 grams of the syrup was diluted to 400 ml. with distilled water to provide a solution containing about 14 percent solids. The solution had a polarimetric reading in a 100 mm. tube of −11° at 20° C. The pH of the composition was adjusted to 2.0 with concentrated hydrochloric acid and the polarimetric reading taken immediately after acidification was found to be the same as that prior to the acidification.

The mixture was digested at a temperature of 70° C. for 20 minutes and then cooled to 20° C. The polarimetric reading of the resulting mixture was observed to be −13.5° at 20° C. The digested mixture was neutralized with 2 N sodium hydroxide and concentrated in vacuum to a specific gravity of 1.46 and then it was mixed with an equal volume of dry methanol, seeded with pure levulose crystals and set aside for crystallization with slow agitation at 25° C. After 48 hours, a batch of crystals was found in the mixture and the crystals were separated by filtration, washed with dry methanol and dried in a vacuum oven at about 50° C. A yield of 26.5 grams of the crystalline material was secured having a specific rotation of −92° and a copper reduction capacity identical to that of pure levulose.

A 10-gram sample of the original syrup was diluted with six volumes of water and subjected to hydrolysis at pH 2.0 and 70° C. for 20 minutes. The hydrolyzed material was neutralized with 2 N NaOH and analyzed for glucose by the glucose oxidase method. The analysis showed the hydrolyzed material to be free from glucose.

A second portion of the mother liquor was mixed with an equal volume of dry methanol, seeded with crystals of pure levulose and set aside at 25° C. with agitation for crystallization. After one week, crystallization was not observed, thus confirming the fact that the unhydrolyzed syrup was incapable of yielding crystalline levulose because of the presence of crystallization-inhibiting substances.

It will be understood that the concepts described with respect to the processing of the liquor or solution by acidification and digesting will be applicable to release levulose for more rapid and complete crystallization in other systems containing inhibitors which slow or reduce the crystallization and recovery of levulose. After the described acid treatment, levulose can be crystallized from concentrated aqueous syrups or from syrups to which precipitating liquids, such as methanol, ethanol, propanol, acetone, and the like have been added, to decrease the solubility of the levulose and to make the precipitation more complete. Use and advantages of such precipitating liquids is well known to those skilled in the art.

It will be further understood that changes may be made in the details of formulation, treatment, and operation without departing from the spirit of the invention, especially as defined in the following claims.

We claim:

1. The method of maximizing the recovery of levulose from a syrup solution containing levulose and levulose polymers with a crystallization inhibiting component present in the syrup which comprises acidifying the solution by addition of a strong acid to adjust the pH to below 4, digesting the mixture at a temperature below 80° C., concentrating the solution by the evaporation of water, allowing the concentrated solution to stand to crystallize levulose from the solution, and then separating the crystals of levulose from the solution.

2. The method as claimed in claim 1 which includes the step of diluting the solution with water to a solids content of 5–50 percent by weight of the solution prior to the acidification step.

3. The method as claimed in claim 2 in which the aqueous solution is adjusted to a solids content of about 20 percent ±5 percent.

4. The method as claimed in claim 1 in which the acidic material added to the solution is selected from the group consisting of a mineral acid, a strong organic acid and mixtures thereof and in which the acid is added in an amount to adjust the pH to below 4.0.

5. The method as claimed in claim 4 in which the solution is acidified to a pH within the range of 0.5 to 4.0.

6. The method as claimed in claim 5 in which the solution is acidified to a pH within the range of 1.0 to 2.0.

7. The method as claimed in claim 1 in which the digesting step is carried out while the aqueous solution is maintained at a temperature within the range of 40–80° C.

8. The method as claimed in claim 7 in which the digesting step is carried out at a temperature of 60–70° C. for a time ranging from 5–60 minutes.

9. The method as claimed in claim 1 in which the aqueous solution is acidified and digested until the numerical negative optical rotation is reduced.

10. The method as claimed in claim 1 in which the solution is acidified and digested until the copper reducing capacity of the solution is increased.

11. The method as claimed in claim 1 in which the levulose and levulose polymer are non-glucose-containing.

References Cited in the file of this patent

UNITED STATES PATENTS

| | | |
|---|---|---|
| 1,763,080 | Arsem | June 10, 1930 |
| 2,434,235 | Vergnaud | June 6, 1948 |
| 2,782,123 | Rubin | Feb. 19, 1957 |
| 2,834,694 | Hill | May 13, 1958 |

FOREIGN PATENTS

| | | |
|---|---|---|
| 272,876 | Great Britain | Dec. 22, 1927 |
| 345,926 | Great Britain | Apr. 2, 1931 |